United States Patent [19]

Bogenschutz

[11] 4,406,444
[45] Sep. 27, 1983

[54] BRAKE HANGER FOR RAILWAY BRAKES

[75] Inventor: Thomas M. Bogenschutz, Clayton, N.Y.

[73] Assignee: General Signal Corporation, Stamford, Conn.

[21] Appl. No.: 275,188

[22] Filed: Jun. 19, 1981

[51] Int. Cl.³ ............................................. F16F 3/10
[52] U.S. Cl. ................................ 267/30; 188/206 R; 248/618; 267/160
[58] Field of Search ............ 267/160, 30; 188/206 R, 188/209, 207, 212; 248/560, 567, 589, 591, 593, 595, 596, 610, 611, 621, 630, 632, 618

[56] References Cited

U.S. PATENT DOCUMENTS

| 1,166,521 | 1/1916 | Hoke | 188/207 |
| 1,761,967 | 6/1930 | Blackmore | 267/30 |
| 1,908,579 | 5/1933 | Vedder | 267/160 X |
| 3,565,219 | 2/1971 | Hydam | 188/206 R |
| 3,696,892 | 10/1972 | Engle | 188/212 |

FOREIGN PATENT DOCUMENTS

| 503041 | 7/1930 | Fed. Rep. of Germany | 248/610 |
| 2017999 | 10/1971 | Fed. Rep. of Germany | 248/630 |
| 1055187 | 10/1953 | France | 267/160 |
| 401402 | 11/1933 | United Kingdom | 188/206 R |

Primary Examiner—George E. A. Halvosa
Attorney, Agent, or Firm—Thomas R. FitzGerald; Harold S. Wynn

[57] ABSTRACT

A brake hanger comprises upper and lower U-shaped lugs of substantially rigid material spaced from each other by a pair of laterally spaced leaf springs which are rigidly secured to the lugs respectively at their opposite ends. The upper lug is adapted to be journaled on a fixed pivot pin secured to the frame of a railway truck, and the lower lug is adapted for journaling connections to a plurality of elements, including a connection to a brake head and a connection to a brake cylinder. The lugs provide rigidity for alignment of their pivots, while the spring rated connection between the plugs provides for substantial lateral movement of the lower lug relative to the upper lug without deforming the parts of the hanger beyond their elastic limits, and without substantially altering braking performance by maintaining side thrust of a wheel flange against a brake shoe carried by the hanger at a minimum.

4 Claims, 4 Drawing Figures

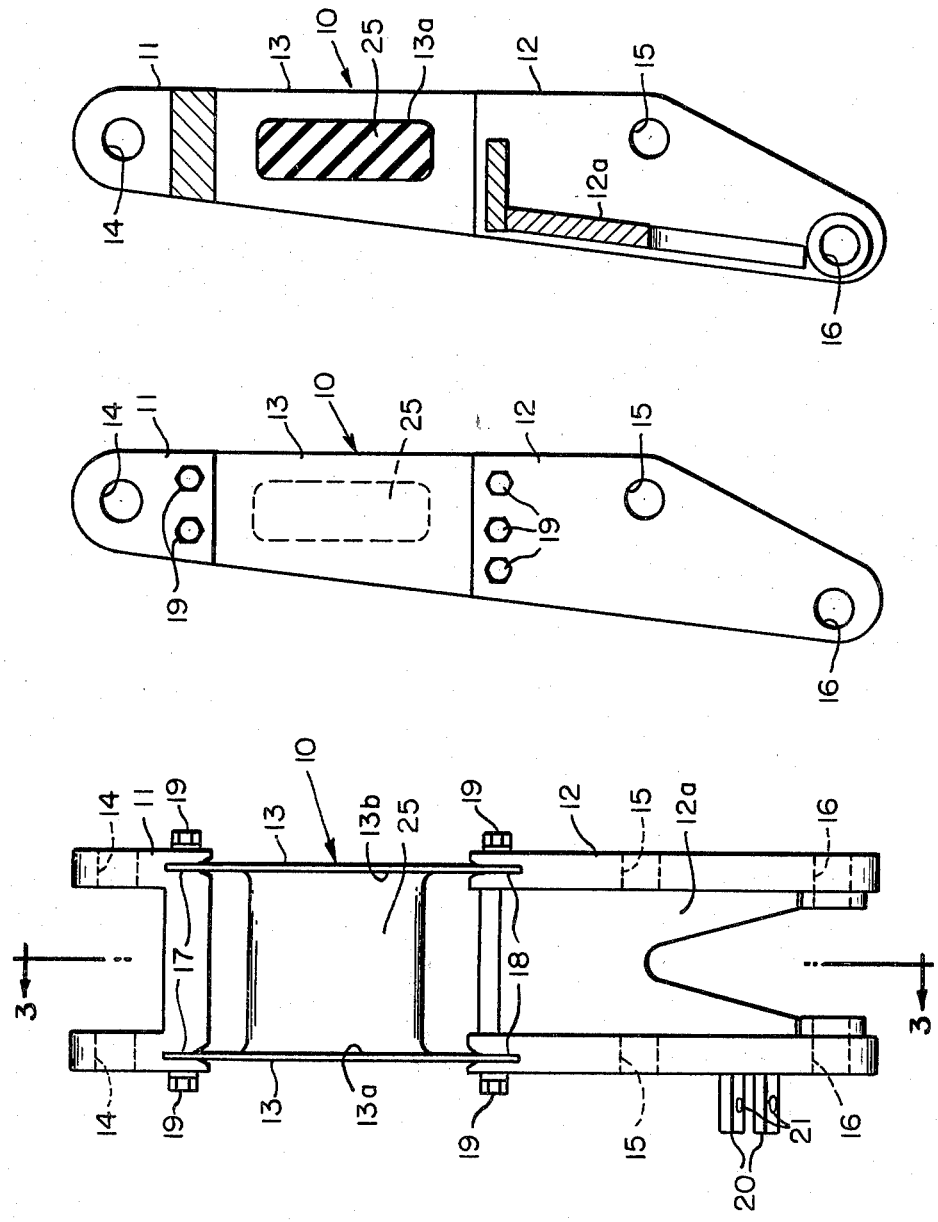

BRAKE HANGER FOR RAILWAY BRAKES

REFERENCE TO PRIOR CASES

The invention relates to prior U.S. Pat. Nos. 1,166,521, granted Jan. 4, 1916, 1,509,907, granted Sept. 30, 1924, and 3,696,892, granted Oct. 10, 1972, which are incorporated herein by reference for a better understanding of the background of the present invention.

BACKGROUND OF THE INVENTION

The present invention relates to brake hangers for railway vehicles, and it more particularly relates to a brake hanger permitting a greater than normal lateral movement of an associated brake shoe within the elastic limits of the hanger.

It is well known that there is some periodic lateral movement of a railway truck relative to the truck wheels, and early patents have disclosed brake hangers that bend to permit limited lateral movement of the brake shoes during braking relative to a truck frame to which the hangers are pivotally secured. Such a hanger is disclosed, for example, in the U.S. Pat. No. 1,166,521, granted Jan. 4, 1916. The hanger according to this patent is formed of bar stock in the shape of a closed or an open link, with the laterally spaced sides of the hanger being forged to be substantially flat for bending more readily in response to lateral movement of the truck frame relative to the wheels. Such repeated bending tends to crystalize the sides of the hanger, causing them to create a safety hazard by breaking and permitting the brake rigging to drop on the trackway in front of a wheel to possibly cause derailment.

These shortcomings are discussed in U.S. Pat. No. 1,509,907, granted Sept. 30, 1924, which provides an improved structure in the form of an articulated hanger requiring ball joint connections at the upper and lower ends of the hanger to prevent bending of substantially rigid laterally spaced side arms of the hanger. These ball joint connections, however, require extra maintenance, and may themselves be sources of breakage upon the freezing up of the joints, and the like.

An object of the present invention is to provide an improved brake hanger which substantially obviates one or more of the limitations of the described prior art hangers.

Another object of the present invention is to provide an improved integral brake hanger that is flexible laterally to accomodate a substantially greater lateral movement of a railway brake head within the elastic limits of the hanger.

Other objects, purposes and characteristic features of the present invention will be in part obvious from the accompanying drawing, and in part pointed out as the description of the invention progresses.

SUMMARY OF THE INVENTION

A brake hanger, according to the present invention, comprises upper and lower lugs formed of substantially rigid material that are interconnected by a pair of spring loaded leaf springs to permit substantial lateral movement of the lower lug relative to the upper lug within the elastic limits of the springs. The leaf springs are preferably laterally spaced by a resilient spacer for damping any harmonic frequencies that may be generated by lateral movements of a railway truck from which the brake hanger may be suspended. This structure is to permit above normal lateral movement of a brake head carried by a brake hanger, as would be required, for example, when tread brakes are used on a GSI radial axle four wheel truck, wherein the brake heads are moved laterally by the wheel flanges as the wheel axles are permitted to turn radially to a limited extent by the suspension system of the truck. This may require a range of lateral movement of the brake shoe up to 2½ inches. The upper lug is adapted to be journaled on a pin secured to the truck frame, and the lower lug is adapted to journal first and second brake operating elements, which can be, for example, journals for a brake head and for an element connected to a brake cylinder.

For a better understanding of the present invention, together with other and further objects thereof, reference is had to the following description, taken in connection with the accompanying drawings.

IN THE DRAWINGS

FIG. 1 is an elevational view of a brake hanger according to a preferred embodiment of the present invention;

FIG. 2 is a side view of the hanger according to FIG. 1;

FIG. 3 is a sectional view of the hanger of FIG. 1 taken along the section line 3—3 as viewed in the direction of the arrows.

Figure 4:
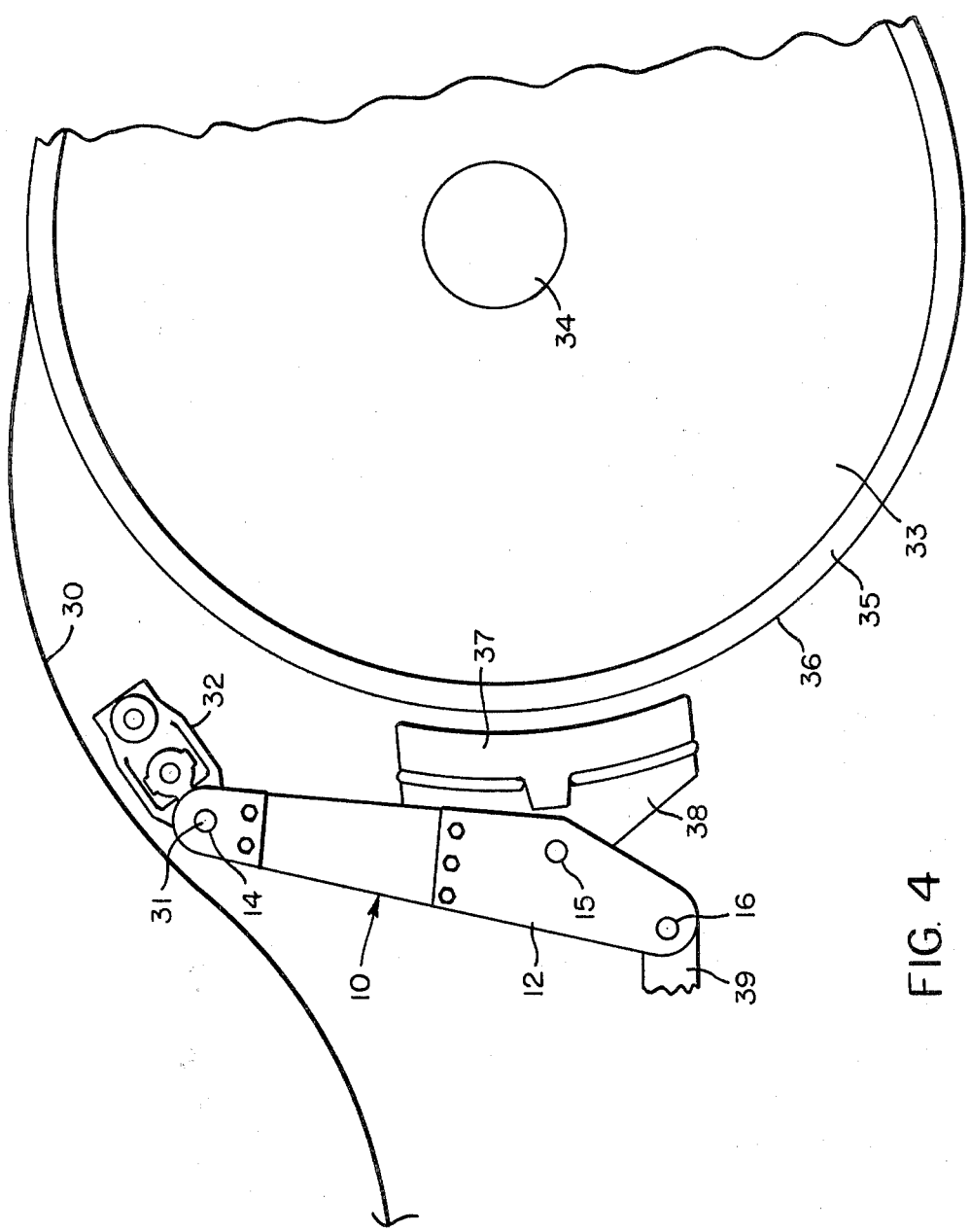
FIG. 4 is an elevational view illustrating how the brake hanger of FIG. 1 can be used in a braking system for a car wheel.

With reference to FIG. 1, a brake hanger 10 comprises an upper lug 11 and a lower lug 12 spaced below it by laterally disposed leaf springs 13. The upper lug 11 is U-shaped, having a bore 14 adapting the lug 11 to be journaled on a fixed pin (not shown) secured to a railway truck frame.

Similarly the lower lug 12 is an inverted U-shaped lug that is adapted to journal first and second elements (not shown) at bores 15 and 16 respectively, which may be, for example, a brake head, and an element connected to a brake cylinder respectively. The lug 12 is strengthened by a web portion 12a (see FIGS. 1 and 3). Slots 17 and 18 are formed in the lower and upper sides of the lugs 11 and 12 respectively for receiving the upper and lower ends of the laterally spaced leaf springs 13. The leaf springs 13 have their ends secured in the slots 17 and 18 by bolts 19 as is shown in FIGS. 1 and 2. The slots 17 and 18 are flared outwardly slightly so as to permit limited flexing of the leaf springs to take place within the slots 17 and 18 of the lugs 11 and 12.

With reference to FIG. 1, additional lugs 20 extend from the left hand side of the lug 12 and have bores 21 therein through for journaling a tie-rod (not shown), that can be provided for extending transversely from one side of the truck to the other to tie the brake hangers on opposite sides of the truck together for the purpose of further providing for smooth lateral movement of the lower lugs 12 relative to the upper lugs 11 in accordance with shifting of the positions of the axles of the truck relative to the truck frame.

The leaf springs 13 are laterally connected by a bar 25 of resilient material, such as rubber, that has a greater width in the longitudinal direction of the leaf springs. The bar 25 is preferably secured at its opposite ends to intermediate inner surfaces of the leaf springs at portions 13a and 13b respectively be bonding.

The hangers 10 can be used, for example, in a braking system such as is disclosed in FIG. 1 of the U.S. Engle Pat. No. 3,696,892, granted Oct. 10, 1972, and assigned to the same assignee as the present invention. According to this braking system, a hanger is used for suspending the tread brake for each wheel from a side of a truck frame, and a horizontally disposed spread type of brake cylinder that is used to exert equal braking pressures on the front and rear wheels on each side of a truck. With reference to FIG. 4, the bracket 10, according to the present invention is illustrated in such a braking system wherein a truck frame 30 journals bracket 10 on a pin 31 secured to the truck frame at 32. The frame 30 carries a wheel 33 on an axle 34, the wheel 33 having a tread 35 and flange 36. A tread brake shoe 37 is pivotally carried by a conventional brake head 38, which in turn is journalled at 15 in the lower U-shaped lug 12. A brake cylinder rod 39 is operably connected to bracket 10 at 16. Brake pressure applied by movement of rod 39 to the right is operable as more fully described in the above U.S. Pat. No. 3,696,892.

Under braking conditions, the upper lug 11 of the brake hanger 10 is of course resticted against lateral movement in order that the brake head journaled at 15 will normally be disposed in a centered position opposite the tread of the wheel. The operation of the brake cylinder (not shown) acts at 16 to apply braking pressure through the lower lug 12 to the tread of a wheel, and as the wheel moves laterally, because of radial movement of its axle, or for other reasons, the flange of the wheel crowds the lower lug 12 laterally, off center relative to the fixed lateral position of the upper lug 11, to whatever extent is required as permitted by the flexing of the leaf springs 13 to accomodate the lateral movement while maintaining the brakes in proper aligned positions. It is very important under these conditions that the lateral thrust of the wheel flange against the brake shoe be maintained at a minimum, so that the lateral movement will not substantially alter braking performance, as compared to a normal condition where there is no lateral deflection of the hanger.

The leaf springs 13 can be designed, for example, to produce a lateral force on a brake head of 102 lbs. at a deflection of 0.375 inches. With a one way lateral deflection of 0.563 inches plus a 1° pivot of the axle, the total maximum deflection becomes 0.875 inches. With a spring rate of 273#/in., the output force of the spring is 238 lbs. Thus, under actual running conditions, the total deflection is plus or minus 0.875 inches.

Having thus described a brake hanger bracket for a railway vehicle as a preferred embodiment of the present invention, it is to be understood that various modifications and alterations may be made to the specific embodiment shown, without departing from the spirit or scope of the invention.

What is claimed is:

1. A brake hanger adapted to be journaled at its upper end on a journal pin secured to a railway truck frame and having first and second journals near its lower end adapted to pivotally journal a first element secured to a brake cylinder and a second element operably attached to a brake shoe for bearing against the tread of a wheel of the truck, wherein an improved hanger bracket permitting lateral flexibility comprises;
   (a) upper and lower spaced substantially rigid U-shaped lug means adapted at their ends to pivot on the journal pin secured to the truck and on a pin connected to a brake rod respectively at opposite ends of the bracket.
   (b) a pair of laterally spaced leaf springs longitudinally connecting opposite sides respectively of the upper and lower U-shaped lug means,
   (c) the upper U-shaped lug means having laterally disposed slots, flared at their outer ends in the lower sides thereof for receiving upper ends of the leaf springs respectively,
   (d) the lower U-shaped lug means having laterally disposed slots, flared at their outer ends, in the upper sides thereof for receiving lower ends of the leaf springs respectively,
   (e) means in each of the U-shaped brackets for securely clamping upper and lower ends respectively of the laterally spaced leaf springs,
   (f) the lower U-shaped lug means being adapted at an intermediate point for journalling a brake head and having a rigid supporting web connecting the sides thereof and extending longitudinally throughout substantially the full length of the lower lug means, and
   (g) the leaf springs being interconnected by a web of resilient material extending longitudinally between the springs and bonded thereto for damping harmonic vibrations of the hanger bracket, that may be generated by lateral movements of a railway truck from which the hanger may be journalled.

2. A brake hanger according to claim 1 wherein bolts are used to securely clamp the ends of the leaf springs within the slots.

3. A brake hanger according to claim 2 wherein the leaf springs are rated in a range of approximately 275 lbs. per square inch.

4. A brake hanger according to claim 1 wherein the resilient material is rubber.

* * * * *